(12) United States Patent
Yaginuma

(10) Patent No.: US 11,447,337 B2
(45) Date of Patent: *Sep. 20, 2022

(54) WIRELESS TAG READING SYSTEM

(71) Applicant: TOSHIBA TEC KABUSHIKI KAISHA, Tokyo (JP)

(72) Inventor: Jun Yaginuma, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,741

(22) Filed: Mar. 22, 2021

(65) Prior Publication Data

US 2021/0206572 A1 Jul. 8, 2021

Related U.S. Application Data

(63) Continuation of application No. 16/816,162, filed on Mar. 11, 2020, now Pat. No. 10,988,312, which is a
(Continued)

(30) Foreign Application Priority Data

Nov. 10, 2017 (JP) .............................. JP2017-217312
Jul. 26, 2018 (JP) .............................. JP2018-140312

(51) Int. Cl.
*B65G 1/137* (2006.01)
*G06K 19/07* (2006.01)
(Continued)

(52) U.S. Cl.
CPC ......... *B65G 1/137* (2013.01); *G06K 19/0723* (2013.01); *G06Q 50/26* (2013.01); *G06K 19/07773* (2013.01)

(58) Field of Classification Search
None
See application file for complete search history.

(56) References Cited

U.S. PATENT DOCUMENTS 11,034,444 B2 6/2021 Kumada
2007/0075911 A1 4/2007 Yaginuma et al.
(Continued)

FOREIGN PATENT DOCUMENTS

JP 2001-163417 A 6/2001
JP 2005-157508 A 6/2005
(Continued)

OTHER PUBLICATIONS

Notice of Reasons for Refusal dated Jun. 7, 2022 in corresponding Japanese Patent Application No. 2018-140312, 8 pages (with Translation).

*Primary Examiner* — Thomas S McCormack
(74) *Attorney, Agent, or Firm* — Kim & Stewart LLP

(57) ABSTRACT

A wireless tag reading system includes a body and three or more tag reading apparatuses arranged along a vertical direction on the body and configured to read identification information from wireless tags using a plurality of frequencies. A total number of the tag reading apparatuses is greater than or equal to a total number of the frequencies, and reading ranges of two of the wireless tag reading apparatuses that are adjacent to each other partially overlap. The wireless tag reading system further includes an information processing apparatus configured to collect the identification information read from the wireless tags by the wireless tag reading apparatuses.

18 Claims, 7 Drawing Sheets

Related U.S. Application Data continuation of application No. 16/137,475, filed on Sep. 20, 2018, now Pat. No. 10,618,733.

(51) Int. Cl.
    *G06Q 50/26*     (2012.01)
    *G06K 19/077*     (2006.01)

(56) References Cited

U.S. PATENT DOCUMENTS

| | | | | |
|---|---|---|---|---|
| 2014/0247116 A1* | 9/2014 | Davidson | ............ | G05D 1/0261 901/1 |
| 2014/0361077 A1* | 12/2014 | Davidson | ............ | G06Q 10/087 235/385 |
| 2017/0109552 A1* | 4/2017 | Berge | ................. | G01S 13/74 |
| 2017/0225336 A1* | 8/2017 | Deyle | ................. | B25J 5/007 |

FOREIGN PATENT DOCUMENTS

| | | |
|---|---|---|
| JP | 2017-062130 A | 3/2017 |
| WO | 2017/061589 A1 | 4/2017 |

\* cited by examiner

| CHANNEL | FREQUENCY[MHz] | TAG READER |
|---|---|---|
| 5 | 916.8 | R2,R6 |
| 11 | 918.0 | R1,R5 |
| 17 | 919.2 | R4 |
| 23 | 920.4 | R3 |

FIG.9

| BOOK NAME | RFID MANAGEMENT NUMBER | STORAGE POSITION | ... | INVENTORY RESULT | BOOK READING POSITION |
|---|---|---|---|---|---|
| ○○○ | AAAA12345678 | A10 | ... | ○ | A10 |
| △△△ | AAAA11111111 | A10 | ... | ○ | A10 |
| XXX | AAAA95843255 | A10 | ... | ○ | A10 |
| ... | ... | ... | ... | ... | ... |

FIG.10

| RFID MANAGEMENT NUMBER | MOVING BODY POSITION | | TAG READER | | | | | | | | BOOK READING POSITION |
|---|---|---|---|---|---|---|---|---|---|---|---|
| | X(m) | Y(m) | R1 | R2 | R3 | R4 | ... | L1 | L2 | ... | |
| AAAA12345678 | 5.5 | 10 | ○ | ○ | | | ... | | | ... | A10 |
| AAAA11111111 | 5.5 | 11 | | ○ | ○ | | ... | | | ... | A10 |
| AAAA95843255 | 5.5 | 12 | | ○ | ○ | | ... | | | ... | A10 |
| ... | ... | ... | ... | ... | ... | ... | ... | ... | ... | ... | ... |

WIRELESS TAG READING SYSTEM

CROSS-REFERENCE TO RELATED APPLICATION

This application is a continuation of U.S. patent application Ser. No. 16/816,162, filed Mar. 11, 2021, which is a continuation of U.S. patent application Ser. No. 16/137,475, filed Sep. 20, 2018, now U.S. Pat. No. 10,618,733, issued on Apr. 14, 2020, which is based upon and claims the benefit of priority from Japanese Patent Application No. 2017-217312, filed Nov. 10, 2017, and Japanese Patent Application No. 2018-140312, filed Jul. 26, 2018, the entire contents of which are incorporated herein by reference.

FIELD

Embodiments described herein relate generally to a wireless tag reading system.

BACKGROUND

In an existing system for managing individual articles, RFID (Radio Frequency Identification) tags (also referred to as wireless tags) are attached to articles such as commodities, books, parts, or other materials. Information such as an identification number (ID) is recorded in a RFID tag attached to the article and is read by a RFID tag reader. In a library or the like, a large number of books with RFID tags may be densely arranged on shelves over a wide area. In a conventional wireless tag reading system, a mobile body provided with tag readers moves around in the area to read the RFID tags of the books for inventorying purposes. However, in the conventional wireless tag reading system, it is difficult to read each RFID tag at a high speed when a large number of RFID tags are densely positioned, as in a library.

DESCRIPTION OF THE DRAWINGS

FIG. 9 is a diagram a book database capable of communicating with a wireless tag reading system according to the embodiment.

FIG. 10 is a diagram of a reading result table in a wireless tag reading system according to the embodiment.

DETAILED DESCRIPTION

In accordance with an embodiment, a wireless tag reading system includes a body and three or more tag reading apparatuses arranged along a vertical direction on the body and configured to read identification information from wireless tags using a plurality of frequencies. A total number of the tag reading apparatuses is greater than or equal to a total number of the frequencies, and reading ranges of two of the wireless tag reading apparatuses that are adjacent to each other partially overlap. The wireless tag reading system further includes an information processing apparatus configured to collect the identification information read from the wireless tags by the wireless tag reading apparatuses.

Hereinafter, example embodiments will be described with reference to the accompanying drawings.

In a wireless tag reading system according to an embodiment, a plurality of wireless tag reading apparatuses reads RFID tags (also referred to as wireless tags) while moving within a search area where a large number of RFID tags are densely arranged. In the example embodiment described below, it is assumed that the search area is a library, and the RFID tag is attached to a book (also referred to as an article) placed on a shelf. In other words, the wireless tag reading system according to the present embodiment is applied to inventory management (that is, collection management) of the library or the like.

Figure 1:
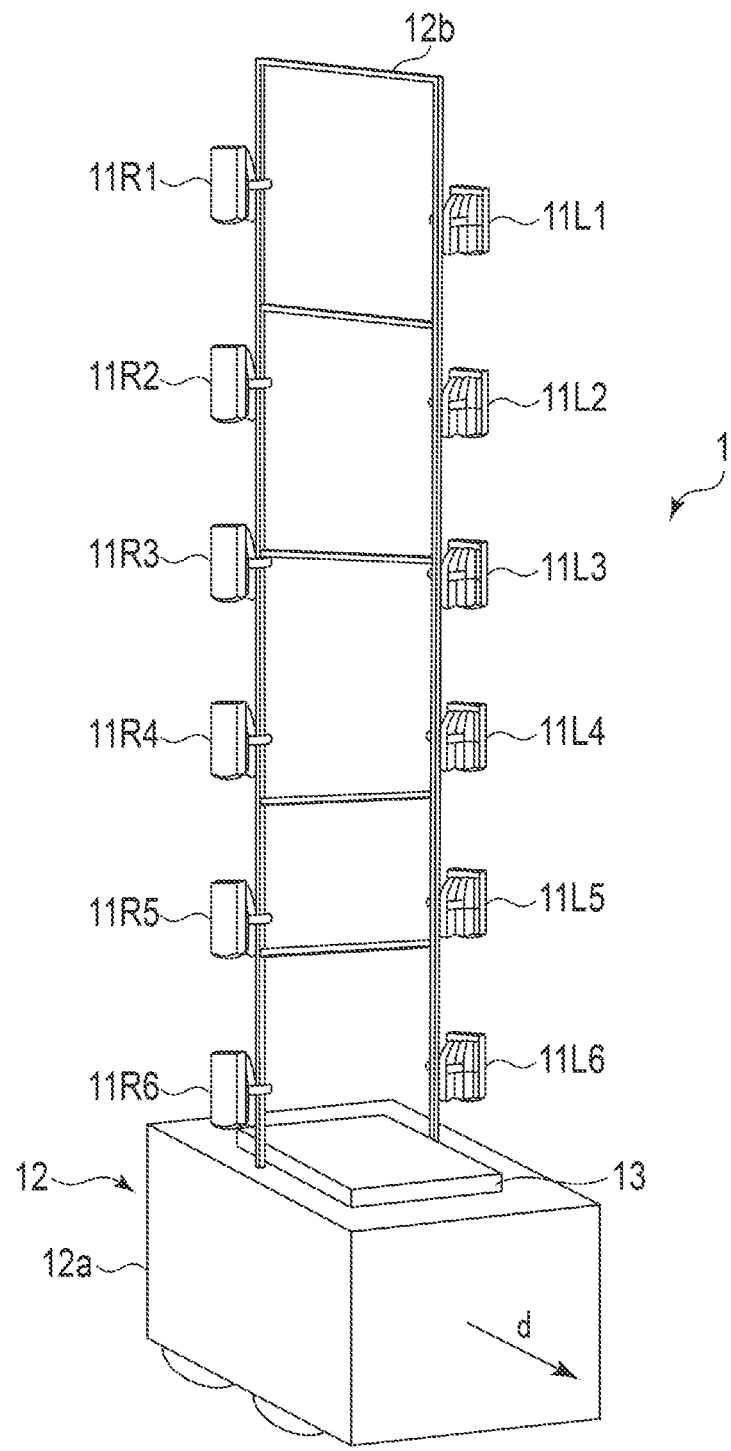
FIG. 1 is an external view of a wireless tag reading system according to an embodiment.

FIG. 1 is an external view of the wireless tag reading system (also referred to as a wireless tag reading apparatus, or inventory robot) 1 according to the present embodiment.

The wireless tag reading system 1 includes wireless tag reading apparatuses 11R1, 11R2 ... 11R6, 11L1, 11L2 ... 11L6, a moving body 12, and an information processing apparatus 13. The wireless tag reading apparatuses (11R1, 11R2 ... 11R6, 11L1, 11L2 ... 11L6) may be referred to in an undifferentiated or collective manner as a wireless tag reading apparatus 11. The wireless tag reading apparatuses (also referred to more simply as tag readers 11) are independently arranged for reading RFID tags. The tag readers 11 are arranged in two tag reader groups, 11Rn and 11Ln, each group (11Rn and 11Ln) being arranged in a vertical direction and adjacent to each other in a horizontal direction and installed on the moving body 12. In FIG. 1, the tag reader group 11Rn (11R1 ... 11R6) on the right side and the tag reader group 11Ln (11L1 ... 11L6) on the left side are respectively arranged in the vertical direction. The tag readers 11 are arranged at preset intervals in the vertical direction.

Each tag reader 11 has an antenna, a communication controller, an interface, and the like. Each tag reader 11 communicates with the information processing apparatus 13 via the interface to supply a reading result of the RFID tag to the information processing apparatus 13. Each tag reader 11 can have a set frequency of radio waves used for communication with the RFID tag selected from a plurality of frequencies or each tag reader 11 can have an adjustable frequency that can be changed. It is assumed that each tag reader 11 can change the frequency at which the information processing apparatus 13 is updated. Each tag reader 11 may be set in such a manner to have a reading range in a specific direction by use of a directional antenna having directivity in order to more easily specify the position of the RFID tag being read.

The moving body 12 is capable of traveling in a library as a search area. In the present embodiment, the moving body 12 can travel autonomously. The moving body 12 has a main body 12a and a support body 12b. The main body 12a is provided with a movement mechanism including wheels and motors, various sensors, a movement controller (also referred to as a movement control device) and the like. In FIG. 1, the information processing apparatus 13 is installed in the main body 12a. The support body 12b supports the tag readers 11 aligned in a vertical direction. The support body 12b is fixed to the main body 12a and moves with the main body 12a.

The information processing apparatus 13 controls operations of each apparatus and performs data communication and data processing and the like. The information processing apparatus 13 is, for example, an electronic device, such as a PC (Personal Computer) or the like. The information processing apparatus 13, for example, communicates with the RFID tag via each tag reader 11, processes data received from the RFID tag, communicates with the moving body 12, performs data communication with an external device, and the like. In the example shown in FIG. 1, the information processing apparatus 13 is installed in the main body 12a of the moving body 12. However, the information processing apparatus 13 may be installed at a location separate from the tag reader 11 and the moving body 12 as long as it can communicate with each tag reader and the movement controller of the moving body 12.

Figure 2:
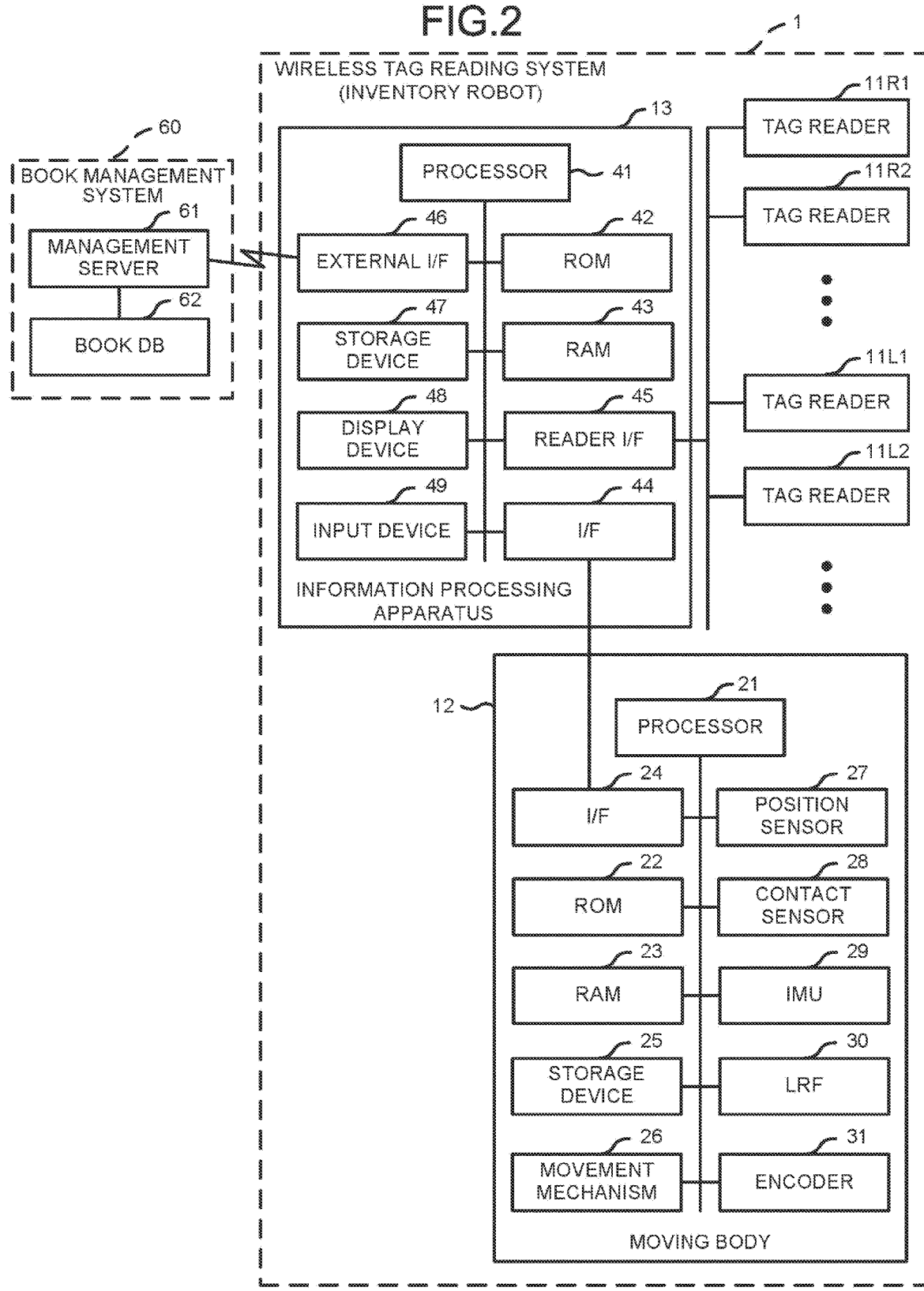
FIG. 2 is a block diagram of a control system of a wireless tag reading system according to the embodiment.

FIG. 2 is a diagram of the control system of the wireless tag reading system 1.

As shown in FIG. 1 and FIG. 2, the wireless tag reading system 1 has tag readers 11, the moving body 12, and the information processing apparatus 13. The information processing apparatus 13 of the wireless tag reading system 1 can communicate with a management server 61 in a book management system 60 as the external device. The book management system 60 manages information relating to books in the library. The book management system 60 has the management server 61 and a book database (DB) 62 which stores information relating to books. The wireless tag reading system 1 and the book management system 60 constitute an inventory system for performing inventory in the library.

In FIG. 2, the moving body 12 includes a processor 21, a ROM (Read Only Memory) 22, a RAM (Random Access Memory) 23, an interface (I/F) 24, a storage device 25, a movement mechanism 26, a position sensor 27, a contact sensor 28, an IMU (Inertial Measurement Unit) 29, an LRF (Laser Rangefinder) 30, an encoder 31, and the like.

The processor 21 is, for example, a CPU (Central Processing Unit). The processor 21 realizes various processing functions by executing programs stored in the ROM 22 or the storage device 25. The ROM 22 is a nonvolatile memory that stores programs to be executed by the processor 21, control data, or the like. The RAM 23 is a volatile memory that functions as a working memory.

The I/F 24 is used for communicating with the information processing apparatus 13. For example, the processor 21 supplies data indicating a movement state and information detected by various sensors to the information processing apparatus 13 via the I/F 24. The processor 21 may acquire information such as a movement instruction from the information processing apparatus 13 via the I/F 24. The I/F 24 may be any interface as long as it can communicate with the information processing apparatus 13, for example, it may be an interface for performing wireless communication.

The storage device 25 is a rewritable nonvolatile memory. The storage device 25 is, for example, a SSD (Solid State Drive) or a HDD (Hard Disk Drive). The storage device 25 stores data indicating the movement status, information detected by various sensors, and the like. The storage device 25 may store programs to be executed by the processor 21, the control data, and the like. For example, the storage device 25 may store programs and data for realizing the later-described movement control.

The movement mechanism 26 moves the moving body 12. The movement mechanism 26 has a motor for generating a driving force for rotating a wheel. The movement mechanism 26 also has a mechanism for changing a movement direction of the moving body 12. The movement mechanism 26 performs movement according to an instruction from the processor 21, changes the movement direction, and the like.

The position sensor 27 is used for detecting the position of the moving body 12. For example, the position sensor 27 is a laser range scanner that uses laser to acquire spatial position information of an object. The position sensor 27 may use a GPS (Global Positioning System) or the like. The contact sensor 28 is used for detecting contact with the book. The IMU 29 is an inertial measurement device. The IMU 29 detects, for example, angles or angular velocities and accelerations of three axes. The LRF 30 is a laser range finder that measures a distance using the laser. The LRF 30 is a distance meter that measures the distance. The encoder 31 measures an amount of rotation of the wheel provided in the moving body 12.

These sensors 27 to 31 acquire various information (that is information indicating the state of the moving body) relating to the movement of the moving body 12. The sensors 27 to 31 supply the measured or detected information to the processor 21. The processor 21 controls movement of the moving body 12 based on the information acquired from the sensors 27 to 31. For example, the processor 21 enables the moving body 12 to autonomously travel along a set route based on the information acquired by the sensors 27 to 31. The processor 21 supplies the position information detected by the position sensor 27 to the information processing apparatus 13.

In FIG. 2, the information processing apparatus 13 includes a processor 41, a ROM 42, a RAM 43, an interface (I/F) 44, an reader interface (I/F) 45, an external interface (I/F) 46, a storage device 47, a display device 48, an input device 49, and the like.

The processor 41 is, for example, a CPU. The processor realizes various processing functions by executing programs stored in the ROM 42 or the storage device 47. The ROM 42 stores programs to be executed by the processor 41, control data, or the like. The RAM 43 functions as a working memory. The processor 41, the ROM 42, and the RAM 43 function as a controller that performs data processing or various control.

The I/F 44 is connected with the moving body 12 in a communicable manner. The processor 41 communicates with the moving body 12 via the I/F 44. For example, the processor 41 acquires information relating to the movement state detected by each sensor of the moving body 12 via the I/F 44. The processor 41 may transmit an operation instruction such as a movement request to the moving body 12 via the I/F 44. However, the I/F 44 may be any interface as long as it can communicate with the moving body 12, for example, it may be an interface for communicating with the moving body 12 in a wireless manner.

The reader I/F 45 is connected with the RFID tag readers 11 in a communicable manner. The reader I/F 45 is connected with each RFID tag reader 11 in a communicable manner through wireless communication such as a near field wireless communication or the like. The reader I/F 45 may be connected to each RFID tag reader 11 through a cable.

The external I/F 46 is a communication unit for communicating with the management server 61 of the book management system 60 which is the external device. For example, the processor 41 communicates with the management server 61 via the external I/F 46 to acquire information stored in the book database 62. The processor 41 may transmit the information collected by a later-described processing to the management server 61 via the external I/F 46.

The storage device 47 is a rewritable nonvolatile memory. The storage device 47 functions as a data storage section. The storage device 47 is a SSD, a HDD, or the like, for example. The storage device 47 stores programs to be executed by the processor 41, control data, and the like. For example, the storage device 47 may store programs and data for executing various processing described later. The storage device 47 stores data acquired through a later-described processing. For example, the storage device 47 creates a reading result table described later. Information stored in the book database 62 described later may be stored in the storage device 47 instead.

The display device 48 displays information. The input device 49 is an operation device for inputting an operation instruction and the like. For example, a display device attached with a touch panel may function as the display device 48 and the input device 49. If a direct operation instruction on the inventory robot which is the wireless tag reading system 1 is unnecessary, the input device 49 may be omitted. The display device 48 may be installed in a location separate from the moving body 12 as a device capable of communicating with the information processing apparatus 13 in a wireless manner.

In FIG. 2, the moving body 12 and the information processing apparatus 13 are described as individual devices. However, the moving body 12 and the information processing apparatus 13 may be integrated. For example, the processor 41 of the information processing apparatus 13 may be connected to each section of the moving body 12 so that the processor 41 executes processing that would have been carried out by the processor 21 otherwise.

The book management system 60 includes an external device capable of communicating with the wireless tag reading system 1. The wireless tag reading system 1 and the book management system 60 cooperate with each other to function as the inventory system. In FIG. 2, the book management system 60 has the management server 61 and the book database 62.

The management server 61 manages the book management system. The management server 61 has a function of communicating with the external device. The book database 62 stores information relating to books handled in the library. The book database 62 stores information indicating a book, information relating to an RFID tag attached to the book, and information indicating a location where the book is placed. The management server 61 controls access to the book database 62 in response to an inquiry from external devices of the book management system 60.

Figure 3:
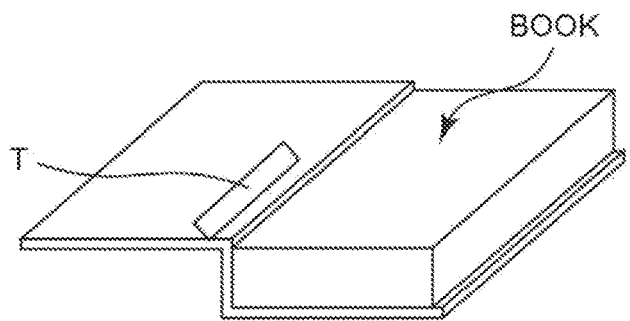
FIG. 3 is a diagram of an RFID tag on a book in a wireless tag reading system according to the embodiment.

FIG. 3 is a diagram of a book to which an RFID tag T is attached.

In the present embodiment, the RFID tags T are attached to the books in the library, which are management objects. The RFID tag T may be attached to any place of each book as long as it is attached to the book. In FIG. 3, the RFID tag T is affixed to a back cover of the book or a location after a front cover is opened (that is, the back cover or a back surface of the front cover). The location where the RFID tag T is affixed is not limited to the example shown in FIG. 3, and the RFID tag T may be affixed to a predetermined region on a spine, a back cover, or a front cover of the book.

Figure 4:
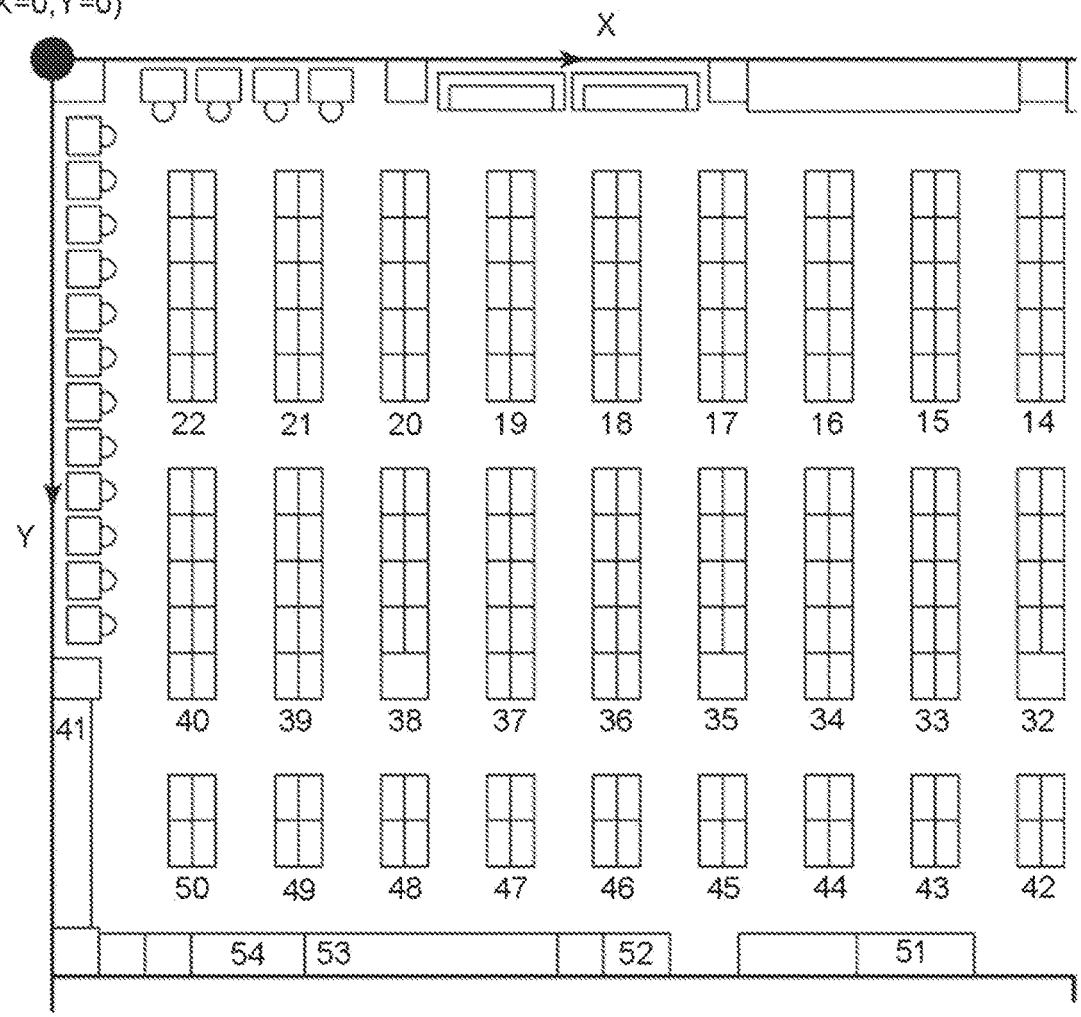
FIG. 4 is a diagram of shelves in which books with RFID tags attached are arranged according to the embodiment.

FIG. 4 is a diagram of the shelves in the library for storing books to which the RFID tags T are attached are arranged.

In FIG. 4, a large number of shelves are arranged in the library, which is a search area. The wireless tag reading system 1 reads the RFID tag T of each book stored in each shelf while moving along a route within the library customized for a layout of the shelves.

Since many books classified according to predetermined conditions are arranged side by side in respective shelves in the library, the RFID tags T to be read by the wireless tag reading system 1 densely exist. The RFID tags T attached to the books stored in the shelf are not necessarily placed in a fixed direction. For this reason, the wireless tag reading system 1 needs to read a large number of RFID tags T arranged in arbitrary directions at high density while moving.

For example, in order to avoid collision of responses from respective RFID tags when reading a large number of RFID tags, a specification conforming to EPCglobal Gen 2 is applied. In EPCglobal Gen 2, a random number (Q value) selected for each RFID tag as an anti-collision is set as an initial value of the counter, and a response method when the counter becomes 0 is stipulated. If the maximum value of the random number set as the Q value is set to be smaller, the response becomes fast, but the number of times the collision occurs increases, and if the maximum value is set to be higher, the probability of occurrence of collision decreases, but the processing time becomes longer.

Generally, as a method of suppressing an amount of transmission and reception in one reading processing, a method of setting the Q value and a method of reducing the output of the tag reader are considered. However, the method of setting the Q value is not suitable to the processing of reading the RFID tag while the tag reader moves because the possibility that the data is missed becomes high when the RFID tags are densely arranged. With the method of reducing the output of the tag reader, the reading range can be narrowed down to reduce the number of RFID tags which are reading objects, but depending on the arrangement and orientation of the RFID tags, the reading becomes difficult. For example, when thin books are placed side by side in the shelf, if the output of the tag reader is reduced, radio waves from the tag reader may not be sufficiently supplied to the RFID tag and there is a possibility that the reading of some RFID tags is missed.

In consideration of the above conditions, the wireless tag reading system 1 according to the embodiment has a configuration in which a large number of RFID tags densely arranged are read without being omitted while the tag reader moves. In other words, the wireless tag reading system 1 has a plurality of tag readers 11 set so as to read a large number of RFID tags densely arranged without omitting any RFID tag even while moving the moving body 12 at a high speed.

Figures 5, 6:
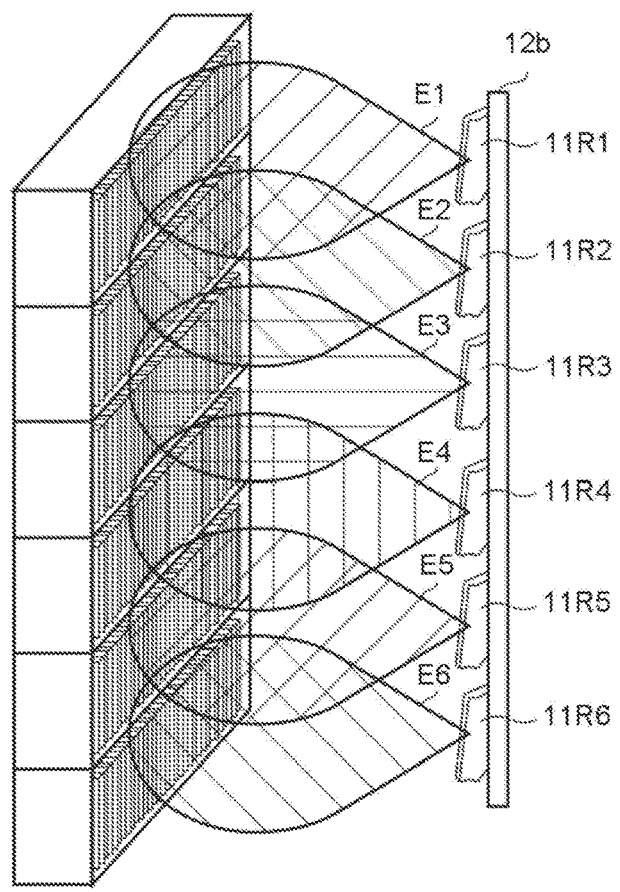
FIG. 5 is a diagram of setting a reading range in which each tag reader communicates with a wireless tag according to the embodiment.
FIG. 6 is a diagram of setting a frequency of radio waves used by each tag reader in a wireless tag reading system for communicating with a wireless tag according to the embodiment.

FIG. 5 is a diagram of a configuration in which tag readers 11 is provided in the wireless tag reading system 1.

As shown in FIG. 5, the tag readers 11 are arranged side by side in the support body 12*b* in the vertical direction. The tag readers 11 each operate independently. The tag readers 11 are arranged in such a manner that a part of the reading ranges of the adjacent tag readers 11 in the vertical direction overlaps. In the tag readers 11, a frequency of radio waves is selected so that there is no interference in the radio waves.

In FIG. 5, the tag readers 11R1, 11R2, 11R3, 11R4, 11R5, and 11R6 are attached to the support body 12*b* in the order from the top. For example, the support body 12*b* is adjusted to the height of the shelves where the books are placed in the library which is the search area.

The tag readers 11 are arranged side by side in such a manner that a reading region E (E1, E2, E3, E4, E5, E6) of one tag reader partially overlaps with the reading regions of the vertically adjacent tag readers in the vertical direction. For example, the reading range E1 of the tag reader 11R1 is set so as to partially overlap with the reading range E2 of the tag reader 11R2. The reading range E2 of the tag reader 11R2 is set in such a manner that an upper region thereof overlaps with the reading range E1 and the lower region thereof overlaps with the reading range E3 of the tag reader 11R3. Likewise, the reading range E3 (E4, E5) is set in such a manner that an upper region thereof overlaps with the reading range E2 (E3, E4) and the lower region thereof partially overlaps with the reading range E4 (E5, E6).

In each tag reader 11 of the wireless tag reading system 1, a frequency is set so that radio waves output by vertically adjacent tag readers in the vertical direction do not interfere with each other.

FIG. 6 is a diagram of the frequency set in each tag reader 11.

FIG. 6 shows four types of frequencies in four channels can be set for tag readers 11. In FIG. 6, a frequency 916.8 MHz (channel "5") is set for the tag readers 11R2 and 11R6, and a frequency 918.0 MHz (channel "11") is set for the tag readers 11R1 and 11R5. In the example shown in FIG. 6, a frequency 919.2 (channel "17") is set for the tag reader 11R4, and a frequency 920.4 MHz (channel "23") is set for the tag reader 11R3.

According to the setting example shown in FIG. 6, different frequencies are set for at least adjacent tag readers 11. In this way, it is possible to prevent radio waves from interfering with each other between adjacent tag readers. FIG. 6 shows a specific example of the setting of frequencies, but the present disclosure is not limited thereto. In other words, a frequency at which radio waves output from one tag reader do not interfere with those output from other tag readers is assigned to the one tag reader from the frequencies at which the RFID tag can respond.

Figure 7:
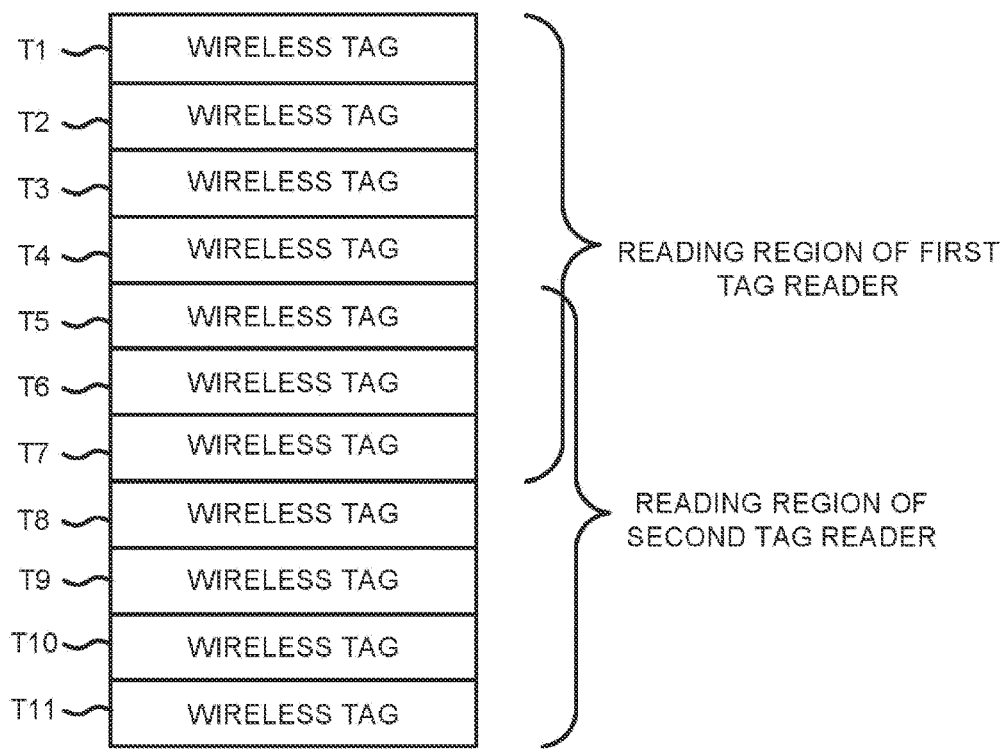
FIG. 7 is a diagram of wireless tags in reading ranges of two adjacent tag readers in a wireless tag reading system according to the embodiment.

FIG. 7 is a diagram of an example of RFID tags (wireless tags T1 to T11) read by two adjacent tag readers 11.

In FIG. 7, wireless tags T1 to T7 exist in the reading range of the first tag reader, and wireless tags T5 to T11 exist in the reading range of the second tag reader. The reading ranges of the first tag reader and the second tag reader partially overlap with each other, and the wireless tags T5 to T7 exist in the overlapped region. Accordingly, the first tag reader reads the wireless tags T1 to T4, and the second tag reader reads the wireless tags T8 to T11. The wireless tags T5 to T7 are read by either the first tag reader or the second tag reader.

Figure 8:
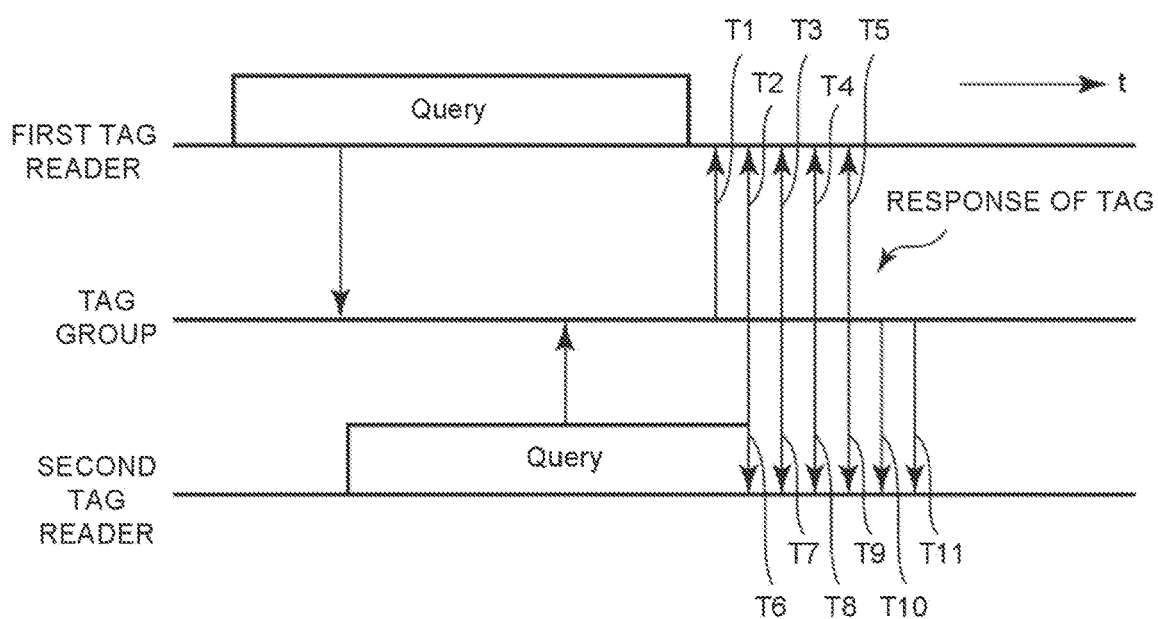
FIG. 8 is a diagram of communication between two tag readers and wireless tags shown in FIG. 7.

FIG. 8 is a diagram of response of the wireless tags T1 to T11 to the first tag reader or the second tag reader shown in FIG. 7.

Each tag reader 11 starts reading the RFID tag by transmitting a Query command. The Query command is used for requesting a response from the RFID tag. If the Query command is received from the tag reader 11, each RFID tag responds to commends from the tag reader 11, and does not respond to commands from other tag readers.

In FIG. 8, the wireless tags T1 to T5 enter the reading state in response to the Query command from the first tag reader. The wireless tags T6 to T11 enter the reading state in response to the Query command from the second tag reader. According to the example shown in FIG. 8, it is possible to reduce the number of RFID tags to which each tag reader performs a response processing in response to one tag reading command, and the processing time in each tag reader can be reduced. According to the example shown in FIG. 8, the number of times the tag readers repeatedly performs data processing on a specific wireless tag (RFID tag) can be reduced. In other words, in the wireless tag reading system 1, the tag readers can process a large number of wireless tags in a distributed manner, and a situation that the same wireless tag is read multiple times can be mitigated. As a result, the wireless tag reading system can shorten a response processing time for the wireless tag, and thus it is possible to move a plurality of tag readers at the high speed.

FIG. 9 is a diagram of a configuration of the book database (DB) 62.

As shown in FIG. 9, the book DB 62 stores information relating to each book managed in the library. The wireless tag reading system 1 accesses the book DB 62 via the management server 61. The wireless tag reading system 1 refers to the information in the book DB 62 to perform an inventory processing for determining whether the book attached with the RFID tag T read by the tag reader 11 is positioned at a proper position. The book DB 62 stores the information as read from the RFID tag T attached to the book and the information relating to the book in an associated manner. The book database 62 stores information indicating the location where the book is required to be stored (referred to as a storage position) as the information relating to the book.

In the example shown in FIG. 9, an RFID management number (also referred to as a tag ID) is stored as the information read from the RFID tag T attached to each book. In FIG. 9, as the information relating to the book, information such as a book name and a storage position is stored in association with the RFID management number. Furthermore, in FIG. 9, information relating to the inventory processing by the wireless tag reading system 1 is also stored. As the information relating to the inventory processing, an inventory result and the position (referred to as a book reading position) at which the book, or more precisely, the RFID tag attached to the book, is read are stored.

FIG. 10 is a diagram of a configuration of a reading result table for storing information indicating the reading result by the tag reader 11.

In FIG. 10, the reading result table stores information such as the RFID management number, a position information (also referred to simply as a "position") of the moving body, presence or absence of a reading result by each tag reader, a book reading position, and the like. The reading result table is stored, for example, in the storage device 47 of the information processing apparatus 13. The moving body position indicates the position of the moving body 12 when the tag reader 11 reads the RFID tag T identified by the RFID management number. As the information indicating the presence or absence of a reading result, information indicating the tag reader 11 that reads the RFID tag identified by the RFID management number is stored. As the book reading position, information indicating the storage position of the book in the shelf estimated from the position when the tag reader 11 first reads the RFID management number is stored. Each time the wireless tag reading system 1 reads a new RFID management number, the wireless tag reading system 1 registers the RFID management number in the reading result table.

Figure 11:
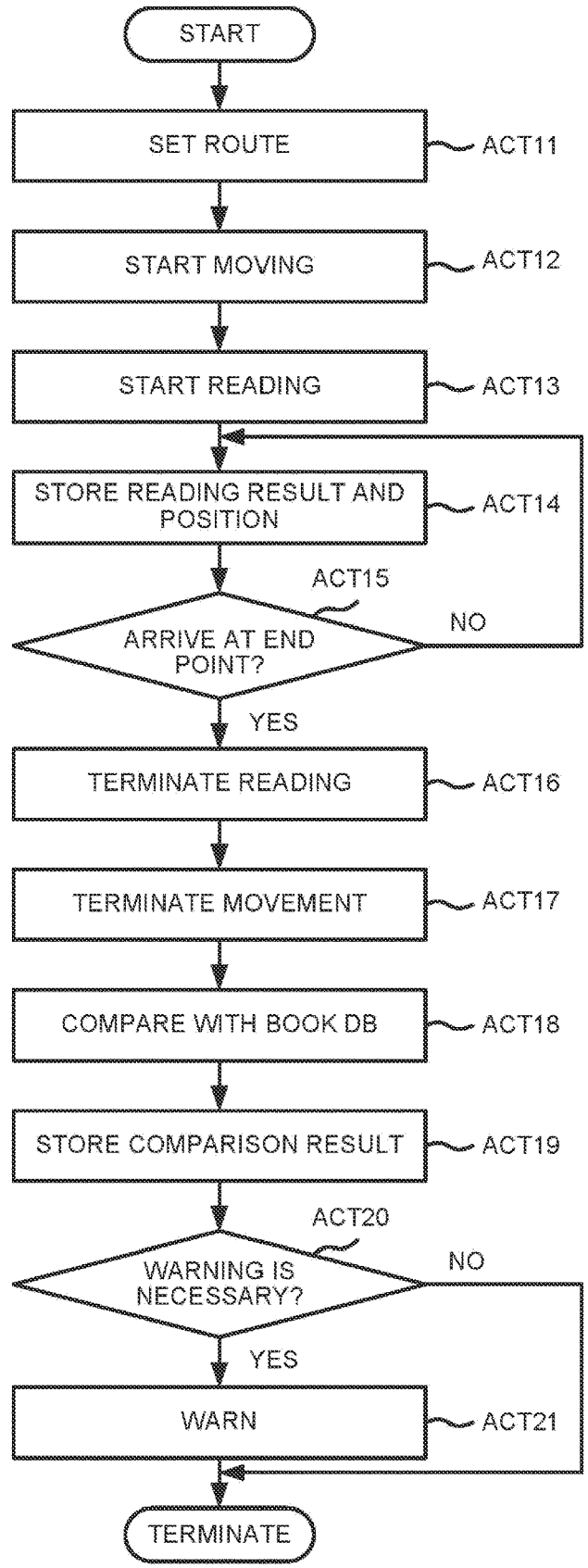
FIG. 11 is a flowchart depicting an operation example of a reading processing and an inventory processing using a wireless tag reading system according to the embodiment.

FIG. 11 is a flowchart depicting an operation example of reading processing and the inventory processing on the wireless tag in the wireless tag reading system 1.

In the example embodiments described below, the operation is assumed to be performed mainly by the processor 41. However, in some other embodiments, the operation may be executed mainly by the processor 21. In the example embodiments described below, the operation may be mainly executed by the management server 61 of the book management system 60 through transmitting an operation instruction to the processor 41 or 21.

First, the processor 41 of the information processing apparatus 13 of the wireless tag reading system 1 sets a movement route (hereinafter, also simply referred to as a route) for movement in the library which is the search area (ACT 11). The processor 41 acquires the information indicating the route and sets the information indicating the route to the moving body 12. The processor 21 of the moving body 12 sets a route along which the moving body 12 is moved by storing information indicating the route from the processor 41 in the storage device 25 or the RAM 23.

For example, the processor 41 may acquire information indicating a route that an operator inputs using the input device 49. The processor 41 may acquire information indicating a route from an external device (for example, the management server of the book management system) that can communicate with the information processing apparatus 13 via the external I/F 46. The processor 41 may create a map generated by the moving body 12 travelling in the search area to determine the route according to the created map.

If the route is set, the processor 21 of the moving body 12 operates the movement mechanism 26 to move the main body 12a to a search start position in the route. If the main body 12a arrives at the search start position, the processor 21 starts moving the main body 12a along the set route (ACT 12). While moving the main body 12a along the route, the processor 21 supplies the information detected by various sensors, such as the position sensor 27, to the information processing apparatus 13. For example, the processor 21 supplies the information processing apparatus 13 with the information indicating the position detected by the position sensor 27 in each predetermined cycle or predetermined movement amount.

If the moving body 12 starts moving on the movement route, the processor 41 starts the plural tag readers 11 via the reader I/F 45 to start the reading processing of the RFID tags T (ACT 13). While the moving body 12 is moving along the route, the processor 41 stores the reading result of the RFID tag T by each tag reader 11 and the position (position information) of the moving body 12 in the reading result table (ACT 14).

If the tag reader 11 reads an unregistered RFID tag T, the processor 41 registers the read RFID management number and information indicating the tag reader in the reading result table. The processor 41 records the position of the moving body 12 when the tag reader 11 reads the RFID tag in the reading result table in association with the RFID management number. For example, the processor 41 specifies the position of the moving body 12 based on the information detected by the position sensor 27, and records the position information in the reading result table.

The processor 41 specifies the book reading position from the position of the moving body 12 when the tag reader 11 reads the RFID tag, and records it in the reading result table. For example, the processor 41 specifies the nearest shelf as the book reading position from the position of the moving body 12 when any one of the tag readers 11 first reads the RFID management number. The processor 41 may specify the book reading position of one RFID tag from the reading result by tag readers 11 in the process of moving. If the processor 41 reads the registered RFID management number, the information indicating the tag reader 11 that reads the RFID management number may also be added to the reading result table.

While the moving body 12 moves along the route (No in ACT 15), the processor 41 repeats the processing of storing the reading result and the position information of the RFID tag T in the reading result table. If the moving body 12 arrives at the end point of the route (Yes in ACT 15), the processor 41 terminates the reading processing of the RFID tag T by each tag reader 11 (ACT 16). If the processor 41 terminates the reading processing of the RFID tag T, the movement of the moving body 12 also terminates (ACT 17). When the reading processing is terminated, the processor 41 may move the moving body 12 to a predetermined standby position and terminate the movement.

If the reading processing of the RFID tag T is terminated, the processor 41 compares the information in the book DB 62 with the information in the reading result table as the inventory processing (ACT 18). The processor 41 compares the information in the book DB 62 with the information in the reading result table to determine the inventory result for each RFID management number. The processor 41 notifies the management server 61 of the inventory result of each RFID management number and records it in the book DB 62 (ACT 19).

For example, the processor 41 determines whether the RFID tag that has been read by the tag reader 11 in the moving body 12 is at a proper position, or whether the RFID tag has been read at the proper position. For example, the processor 41 collates the RFID management number. The processor 41 determines whether the book reading position is the proper position depending on whether or not the book reading position of the reading result is coincident with the storage position stored in the book DB 62 or has a positional relationship of an allowable range with the storage position stored in the book DB 62. If it is determined that the book reading position is the proper position with respect to the storage position, the processor 41 determines that the book to which the RFID tag is attached is in the proper position (the inventory result is positive). The processor 41 may display the inventory result of each RFID management number on the display device 48 or may store it in the storage device 47.

The processor 41 determines whether to notify a warning about the inventory result based on the reading result (ACT 20). For example, when the RFID tag is determined to be not in the proper position, the processor 41 determines that a warning is issued. The processor 41 may notify a warning when there is the RFID management number that cannot be read by the tag reader 11 among the RFID management numbers stored in the book DB 62.

If it is determined that the warning is notified (Yes in ACT 20), the processor 41 displays the inventory result to be warned on the display device 48 (ACT 21). For example, the processor 41 displays, on the display device 48, the information (book name, book reading position, etc.) relating to the book to which the RFID tag not located at the proper position is attached as the warning. As the warning, the processor 41 may notify information relating to the book identified by the RFID management number that the tag reader 11 cannot read among the RFID management numbers stored in the book DB 62.

The wireless tag reading system according to the embodiment described above collects the reading result of the wireless tag by each tag reader while moving the moving body on which the tag readers are arranged along the vertical direction. The tag readers are installed in such a manner that the reading ranges of the tag readers adjacent to each other partially overlap. The frequency of radio waves used for radio communication in each tag reader is different from those in the adjacent tag readers.

With these configurations, in the wireless tag reading system according to the example embodiment described above, multiple tag readers can process a large number of wireless tags in a distributed manner, and a situation that the same wireless tag is read multiple times can be mitigated. The wireless tag reading system according to the example embodiment described above can shorten the response processing time for the wireless tag by each tag reader provided in the moving body, and thus it is possible to move the moving body at the high speed.

The wireless tag reading system according to the example embodiment described above estimates the position of the wireless tag read by the tag reader based on the position of the moving body in which the tag readers are arranged side by side in the vertical direction. The wireless tag reading system determines whether the article is at a proper position based on the database for storing the storage position of the article to which the wireless tag is attached and the position of the wireless tag estimated from the reading result. Furthermore, the wireless tag reading system outputs a warning if it is determined that the article is not in the proper position.

Thus, the wireless tag reading system according to the example embodiment described above can realize the inventory processing at the high speed based on the reading result of the wireless tag by multiple tag readers in the moving body moving at the high speed. Furthermore, if it is determined that the article is not in the proper position in the inventory processing, the warning is output, and the operator can be informed quickly.

While certain embodiments have been described, these embodiments have been presented by way of example only, and are not intended to limit the scope of the invention. Indeed, the novel embodiments described herein may be embodied in a variety of other forms. Furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A wireless tag reading system, comprising:
   a body;
   three or more wireless tag reading apparatuses arranged along a vertical direction on the body and configured to read identification information from wireless tags using a plurality of frequencies, wherein a total number of the wireless tag reading apparatuses is greater than or equal to a total number of the frequencies, and reading ranges of two of the wireless tag reading apparatuses that are adjacent to each other partially overlap; and
   an information processing apparatus configured to collect the identification information read from the wireless tags by the wireless tag reading apparatuses, wherein
   two of the wireless tag reading apparatuses that are not adjacent to each other use a same frequency.

2. The wireless tag reading system according to claim 1, wherein when the total number of the wireless tag reading apparatuses is greater than the total number of the frequencies, one or more of the frequencies are used by more than one of the wireless tag reading apparatuses.

3. The wireless tag reading system according to claim 1, further comprising:
   three or more additional wireless tag reading apparatuses arranged along the vertical direction on the body and each arranged adjacent to one of said three or more wireless tag reading apparatuses along a horizontal direction.

4. The wireless tag reading system according to claim 3, wherein the horizontal direction is parallel to a surface on which the wireless tag reading system is disposed.

5. The wireless tag reading system according to claim 1, further comprising:
   a sensor configured to detect a position of the body, wherein
   the information processing apparatus is configured to store the identification information in a memory in association with the position of the body detected by the sensor.

6. The wireless tag reading system according to claim 5, wherein the information processing apparatus is configured to determine a current position of an article to which a wireless tag detected by at least one of the wireless tag reading apparatuses is attached based on the position of the body detected by the sensor at a time of the detection of the wireless tag.

7. The wireless tag reading system according to claim 6, wherein the information processing apparatus is configured to:
   upon detection of the wireless tag, read a predetermined storage position and associated identification information of a corresponding article from a database, and
   determine whether the current position of the article is within an allowable range from the predetermined storage position.

8. The wireless tag reading system according to claim 7, wherein the information processing apparatus is further configured to issue a warning when the determined position is not within the allowable range.

9. A wireless tag reading system, comprising:
   a body;
   three or more wireless tag reading apparatuses arranged along a vertical direction on the body and configured to read identification information from wireless tags using a plurality of frequencies, wherein a total number of the wireless tag reading apparatuses is greater than or equal to a total number of the frequencies, and reading ranges of two of the wireless tag reading apparatuses that are adjacent to each other partially overlap; and
   an information processing apparatus configured to collect the identification information read from the wireless tags by the wireless tag reading apparatuses, wherein
   the body includes a support body having a height corresponding to a shelf in which an article having a wireless tag is stored.

10. An inventory robot, comprising:
    a main body;
    a support body disposed on the main body and extending along a vertical direction;
    three or more wireless tag reading apparatuses arranged along the support body and configured to read identification information from wireless tags using a plurality of frequencies, wherein a total number of the wireless tag reading apparatuses is greater than or equal to a total number of the frequencies, and reading ranges of two of the wireless tag reading apparatuses that are adjacent to each other partially overlap; and an information processing apparatus disposed in the main body and configured to collect the identification information read from the wireless tags by the wireless tag reading apparatuses, wherein two of the wireless tag reading apparatuses that are not adjacent to each other use a same frequency.

11. The inventory robot according to claim 10, wherein when the total number of the wireless tag reading apparatuses is greater than the total number of the frequencies, one or more of the frequencies are used by more than one of the wireless tag reading apparatuses.

12. The inventory robot according to claim 10, further comprising:

three or more additional wireless tag reading apparatuses arranged along the vertical direction on the support body and each arranged adjacent to one of said three or more wireless tag reading apparatuses along a horizontal direction.

13. The inventory robot according to claim 12, wherein the horizontal direction is parallel to a surface on which the inventory robot is disposed.

14. The inventory robot according to claim 10, further comprising:

a sensor configured to detect a position of the inventory robot, wherein the information processing apparatus is configured to store the identification information in a memory in association with the position detected by the sensor.

15. The inventory robot according to claim 14, wherein the information processing apparatus is configured to determine a current position of an article to which a wireless tag detected by at least one of the wireless tag reading apparatuses is attached based on the position detected by the sensor at a time of the detection of the wireless tag.

16. The inventory robot according to claim 15, wherein the information processing apparatus is configured to upon detection of the wireless tag, read a predetermined storage position and associated identification information of a corresponding article from a database, and determine whether the current position of the article is within an allowable range from the predetermined storage position.

17. The inventory robot according to claim 16, wherein the information processing apparatus is further configured to issue a warning when the determined position is not within the allowable range.

18. The inventory robot according to claim 10, wherein the support body has a height corresponding to a shelf in which an article having a wireless tag is stored.

* * * * *